United States Patent

Sorg et al.

[11] Patent Number: 5,634,958
[45] Date of Patent: Jun. 3, 1997

[54] METHOD AND APPARATUS FOR CONDITIONING AND HOMOGENIZING A GLASS STREAM

[75] Inventors: Helmut Sorg, Glattbach; Richard Sims, Lohr am Main, both of Germany

[73] Assignee: Beteiligungen Sorg GmbH & Co. KG, Lohr am Main, Germany

[21] Appl. No.: 259,546

[22] Filed: Jun. 14, 1994

Related U.S. Application Data

[63] Continuation-in-part of Ser. No. 175,283, Dec. 29, 1993, abandoned.

[30] Foreign Application Priority Data

Jun. 15, 1993 [DE] Germany ............ 43 19 773.6
May 2, 1994 [DE] Germany ............ 44 15 148.9

[51] Int. Cl.⁶ ............... C03B 5/16; C03B 5/18; C03B 5/23
[52] U.S. Cl. ............ 65/135.1; 65/135.3; 65/136.4; 65/178; 65/346
[58] Field of Search ............... 65/135.1, 135.3, 65/136.4, 137, 346, 326, 337, 178, 160

[56] References Cited

U.S. PATENT DOCUMENTS

| | | |
|---|---|---|
| 1,845,824 | 2/1932 | Amsler . |
| 1,986,575 | 1/1935 | Honiss . |
| 2,394,893 | 2/1946 | Brown . |
| 3,133,803 | 5/1964 | Denman . |
| 3,248,203 | 4/1966 | Cunningham . |
| 3,582,310 | 6/1971 | Avery et al. . |
| 3,645,712 | 2/1972 | Ihrig et al. . |
| 4,029,488 | 6/1977 | Rhett . |
| 4,146,375 | 3/1979 | MacPhersi et al. ............ 65/137 |
| 4,652,293 | 3/1987 | Samejima et al. ............ 65/136.4 |
| 4,693,740 | 9/1987 | Norret et al. ............ 65/136.4 |
| 4,738,706 | 4/1988 | Picinelli ............ 65/137 |
| 4,764,198 | 8/1988 | Lythgoe ............ 65/346 |
| 4,854,960 | 8/1989 | Lindgren et al. . |

FOREIGN PATENT DOCUMENTS

| | | |
|---|---|---|
| 0212539 | 3/1987 | European Pat. Off. . |
| 2410763 | 9/1974 | Germany . |
| 2507015 | 9/1975 | Germany . |
| 3119816 | 1/1983 | Germany . |

OTHER PUBLICATIONS

Publication entitled "Glass–Making Today", P.J. Doyle Portcullis Press Redhill, 1979, p. 199.

Richard Sims, "Increased Conditioning Time Leads to Improved Thermal Homogeneity", Glass Industry magazine, Nov., 1991, pp. 8–15.

*Primary Examiner*—Peter Chin
*Assistant Examiner*—Steven P. Griffin
*Attorney, Agent, or Firm*—Hill, Steadman & Simpson

[57] ABSTRACT

At least one cooling zone and a subsequent homogenization zone are installed between the inlet and the outlet of a forehearth for conditioning and homogenizing a stream of colored glass. The glass temperature in the forehearth is reduced from the inlet temperature T1 to an outlet temperature T2. In order to increase the cooling effect while simultaneously homogenizing the glass temperature at a throughput of at least 70 tons per day, a raised area is installed in the bottom along the length of the cooling zones to set a maximum bath depth Dmax of 120 mm. Furthermore, the cooling capacity is such that the temperature 20 mm above the bottom is reduced by at least 40° C. in the cooling zone. In the apparatus used, the raised area above the bottom covers the complete length of the cooling zones K. The maximum depth Dmax of the glass bath is 120 mm above the raised area and in the homogenization zone the channel is at least 30 mm deeper.

18 Claims, 6 Drawing Sheets

METHOD AND APPARATUS FOR CONDITIONING AND HOMOGENIZING A GLASS STREAM

BACKGROUND OF THE INVENTION

This is a continuation-in-part application of U.S. Ser. No. 08/175,283, filed Dec. 29, 1993, now abandoned.

The invention concerns a method for conditioning and homogenizing a continuously flowing stream of colored glass, in particular of amber or green glass, in a conditioning stretch in a forehearth, which extends from an inlet to an outlet, and which consists of at least one cooling zone and a subsequent homogenizing zone for the glass temperature, whereby the temperature in the conditioning stretch is reduced from the inlet temperature T1 to the working temperature T2, preferably for the production of molded glass articles such as containers and pressed glass articles.

Whereas the temperatures necessary for melting glass depend on the composition, on the production process and on other factors, the temperatures required for processing the glass are normally lower than the melting temperatures of the glass. Consequently the glass must be cooled between the melting and working processes. Cooling of the glass is a part of the so-called "conditioning", during which the glass is prepared for processing. The achievement of the level of thermal homogeneity necessary for the particular working process is also part of the conditioning of the glass.

Conditioning of the glass can only take place when the glass has left the actual melting unit. Certain developments in the recent past have radically changed the situation concerning the cooling of glass. Various improvements have been made in the melting furnaces which have resulted in a significant increase in the specific melting capacity, i.e. the melting capacity related to the area of the melting zone. Consequently the temperature of the glass leaving the furnace has increased. Other melting aids, such as bubblers or bottom heating, which have the effect of increasing the glass temperature on the bottom of the melting tank, have also led to an increase in the temperature of the glass leaving the melting tank.

Continual improvements have also been made to glass processing machines, amongst other things, to increase the throughput. Whereas in the 1960's and 1970's, machines for the mass production of containers were equipped with 6, 8 or 10 stations each for two gobs, nowadays 12 to 16 stations each for two gobs or 10 stations each for three or four gobs are used. The throughput capacity of individual machines has therefore been greatly increased.

As a result of the factors mentioned above, significantly more heat must now be removed from the glass after it has left the melting tank and before it is worked than in the past. The increase in the throughput of the individual machines has also reduced the residence time of the glass in those parts of the system where the glass conditioning takes place. Thus, a greater amount of heat must be removed in a shorter time. This results in the fact that the productivity of the complete production line depends to a large extent on the cooling capacity along the conditioning stretch. However, numerous technical problems must also be taken into consideration.

As a result of the relatively high viscosity of the glass, the flow of glass in forehearths, the basic form of which is normally a channel, is laminar. It is usual for a velocity profile to be established in the glass bath, in which the maximum lies on the glass surface approximately in the center of the channel. As the viscosity depends on the temperature of the glass, there is an interaction between the glass temperature, the heat losses and velocity of the glass. Wherever the velocity in a particular area is lower, the resulting increase in the residence time leads to higher heat losses. Thus, the temperature sinks even further, and the increased viscosity leads to an additional decrease in the velocity.

At a constant throughput, a reduction of the velocity in one area automatically leads to an increase in the velocity in other areas with higher glass temperatures. This results in a reduction of the residence time in the higher temperature areas and so reduces the effective cooling capacity. For this reason the area of the glass bath affected by a cooling system must be clearly defined, and, as far as possible, this cooling area must avoid areas in which there are low flow velocities.

Areas of low temperatures and higher viscosity produce an effective reduction in the flow cross-section, which in turn leads to an increased drop in the glass level between the melting tank and the extraction point. This can also result in production disturbances.

Furthermore, when glass of a certain composition is cooled below a specific temperature limit, which is dependent on the glass composition, crystals can be formed, a process known as "devitrification". This process can also cause significant disturbance in the production. Therefore the cooling of the glass bath to temperatures below the devitrification temperature should be avoided. As crystal formation depends on both the temperature and time, the residence time of the glass in the critical temperature range is also an important factor.

The transport of heat within the glass bath itself is almost completely by radiation, whereby the transport velocity depends on the glass composition. For example, the presence of ferrous iron or chromium, which are used as coloring agents in green glass, reduces the rate of heat transport in the glass bath in comparison with a colorless glass. This results in a delay in the heat transport from the lower areas of the glass bath. However, the lower areas of the glass bath must be cooled. If the cooling is applied too late, then no effective cooling effect can be observed in the lower areas of the glass bath.

Numerous cooling systems for glass conditioning are known, in most of which the heat transport is primarily by radiation. This type of heat removal is advantageous because the heat is not removed directly from the glass surface, but from a layer of the glass bath, the thickness of which depends on the radiation transmission of the glass. The Stefan-Boltzmann Law is used to calculate the amount of heat transported by radiation. An important factor in this mathematical function is the temperature difference between the radiator and receiver. Applying this function to a typical case for the glass industry, the temperature of the radiator is the temperature of the glass. Therefore the temperature of the receiver determines the amount of heat which is removed.

U.S. Pat. No. 3,645,712 describes the installation of water cooled plates in a forehearth, whereby the width of, and distance of, such plates from the melt is so low that only the center of the glass stream and only the surface thereof are intensively cooled. The distance quoted can be varied between 1.27 and 15.24 cm. Measurements made across the glass bath 7.62 cm below the bath surface, and made in conjunction with supplementary air cooling, show a clear wave shaped temperature variation, with the absolute minimum point in the middle of the channel, whereby temperature differences of between 6° and 18° C. were found between the maximum and minimum. This temperature profile extends along at least part of the subsequent homogenizing zone. At the measuring point the glass bath is approximately 40 cm deep, so that the area of melt near the bottom is not effectively cooled and a significant temperature gradient from the bath surface to bottom is to be expected. This situation is not significantly changed by the raised bank installed at the beginning of the forehearth, as this covers only about half of the cooling zone length and in which area a glass bath depth of approximately 25 cm can be assumed. Furthermore, it is stated that the bath must have a considerable depth.

When the distance between the cooling plates and the glass bath surface is increased the temperature profile straightens out, but an increasing amount of energy is removed from the heating gases, which is detrimental to the thermal efficiency of the forehearth.

U.S. Pat. No. 2,888,781 describes a forehearth with basically a single depth, except for a deepened area situated approximately half way along a forehearth, in which a cooling coil, stirrers and electrodes are installed, which are all designed to homogenize the glass temperature. Even if this is successful, the homogeneity is reduced again in the following cooling zone, which includes a long radiation opening in the forehearth roof. The glass temperature is reduced from 1316°–1371° C. to 1116° C. The length of the following homogenization zone from the beginning to the extraction point is shorter than the length of the radiation opening.

U.S. Pat. No. 4,029,488 describes cooling units installed in the bottom of the channel at the forehearth entry, such that the glass flows over the cooling units, which are thereby said to exert an intensive cooling effect. At the beginning of the forehearth two cooling units are installed in line along the center line of the channel, followed by two more cooling units installed side by side. However, a strong cooling effect is only exerted at some distance from the forehearth entry.

This type of cooling unit extracts heat only from the layer of glass directly in contact with it, which is of necessity on the bottom of the channel. In practice it is difficult to move this layer, even when stirrers are used. Furthermore the depth of glass in the channel is relatively high, so that it is difficult to achieve a more or less homogeneous temperature distribution. The stirrers cannot be installed deep enough to pick up the cold bottom layer as this would cause too much corrosion to the refractories.

German Patent DE-PS 25 07 015 describes the use of water cooled stirrers in the melting tank itself, between a melting and refining section with a high temperature on the one hand and a refining zone with a lower temperature on the other, in order to increase the homogenization and to improve the quality of the glass. However, this requires a longer melting tank, and the problems connected with further cooling and temperature homogenization before the processing of the glass are not solved.

Finally, it is known from German Patent Application DE-OS 31 19 816 that it is possible to divide a forehearth into five zones, the first two of which are a rapid cooling zone and a fine cooling zone. The glass is mechanically stirred in the third zone, and the fourth zone is an equalizing section for homogenizing the temperature before the glass enters the fifth zone, in which the normal gob is formed. Enclosed channels are provided in the roof and the bottom of both the rapid cooling and fine cooling zones for the selective or simultaneous flow of a cooling fluid. However, the heat removal per unit length of the two cooling zones is still limited, so that the glass must flow through a zigzag-shaped channel, in which additional electrodes are installed to heat the glass in the so-called "dead corners". Cooling and additional heating of the glass must therefore be carried out simultaneously, so that large quantities of heat are passed from the additional heating to the cooling zones.

In "GLASS-MAKING TODAY" (Doyle, 1979, Portcullis Press, Redhill/GB, pages 199/200) a forehearth is described with air cooling for the glass and with a glass bath depth of 152 mm, whereby the glass bath width should be 91.4 cm for a throughput of 90 tons per day and 122 cm for a throughput of 150 tons per day. It can be assumed that with flint glass these parameters are sufficient to achieve the necessary level of homogenization; there is no information about colored glass.

In "Increased Conditioning Time Leads to Improved Thermal Homogeneity", (Sims, "GLASS INDUSTRY", November 1991, pages 8–15), a forehearth is described with a throughput of 70 tons per day of green glass, in which the temperature in the first third of the forehearth is reduced from 1290° to 1180° C., i.e. a reduction of 110° C., and in which the glass is homogenized in the following homogenizing zone as far as the bowl with the extraction point, to a level where the maximum temperature difference is 4° C., measured in the center of the stream, from top to bottom at depths of 25 mm, 75 mm and 125 mm. This result must be considered to be very good for the given throughput of green glass. All other measurements were carried out at only 25 mm below the glass surface.

Subsequent measurements and calculations have shown that the temperature of the melt entering the cooling zone 20 mm above the bottom is approximately 1220° C., and the temperature of the glass just above the bottom can only be reduced to about 1210° C. in the cooling zone, i.e. only by about 10° C. Therefore only a relatively low amount of energy is removed on average.

With larger throughputs, and/or when it is necessary to reduce the glass temperature by a large amount, it is neither possible to remove the larger amounts of energy involved, nor is it possible to reach the necessary level of thermal homogeneity, simply because the lower layers of the glass stream do not participate sufficiently in the heat transfer by radiation. The temperature curve measured along the length of the forehearth becomes flatter and the minimum point moves along towards the extraction point to the detriment of the homogenization zone.

It would be possible to increase the channel width in proportion to the increase in throughput, whilst maintaining a given bath depth of 15 cm. However, this approach is limited by constructional problems. In addition, the temperature difference between the two side streams and the central stream (the horizontal temperature profile and the horizontal velocity profile are both parabolic) will increase without additional side heating. This decreases the thermal efficiency, as this heat must also be removed later.

As already explained, the bath depth cannot be increased to more than 15 cm, and therefore it is logical at a given bath depth to increase the flow velocity, at least for a part, and to increase the length of the cooling zone, in order to increase the residence time of the melt in the cooling zone.

As described above, an increase in the surface cooling alone is not sufficient, as the temperature gradient from top to bottom increases: a hotter and, as a result of its lower viscosity, faster moving bottom layer flows below a relatively cold, high viscosity surface layer. This effect cannot be compensated by any cooling zone, regardless of length. A compromise must therefore be sought.

The conditions are particularly difficult in the case of amber or green glasses, which absorb a significant proportion of the longer wavelength radiation. In "Glass Furnaces" (German—"Glasschmelzwannen"), published by the Springer Publishing Company in 1984, Trier, shows in a diagram on pages 211 and 212 that the radiation transmission of amber and green glasses at a temperature of 1300° is only approximately 15–25% of the transmission of white flint glass (for example for tableware or window glass). Increasingly poor cooling conditions therefore exist with both increasing glass bath depth and increasing glass color. This leads to increasingly large temperature differences between the glass surface and the bottom parts of the glass bath. Particularly long homogenization zones are then necessary to compensate for these conditions, whereby such zones require significant amounts of energy. Furthermore, the space requirements for such zones poses a further problem. As already indicated, these problems also increase in severity by a factor of 4–6 as the glass color becomes darker.

The problem of cooling in the deeper areas of the glass bath could conceivably be solved by reducing the glass bath depth in the forehearth or feeder. However, this solution would lead to the establishment of a glass level loss as a result of the temperature dependance of the glass viscosity and the typical flow pattern which occurs in highly viscous liquids, whereby the extent of the glass level loss would increase with increasing throughput. High throughput levels are exactly what is required for modern glass production units. However, a significant glass level loss must be avoided in the forehearth or feeder, as this would make it impossible to apply the same production parameters at each outlet.

SUMMARY OF THE INVENTION

An object of the present invention is therefore to provide a method of the type described initially, whereby with a high throughput of colored glass through the forehearth and when it is necessary to reduce the glass temperature by a large amount, both a strong cooling effect and a good homogenization are achieved. As already demonstrated, these objectives are diametrically opposed to one another to a certain extent.

The object is achieved according to the invention by the application of the method described initially in which in the at least one cooling zone, with a throughput of at least 70, preferably 90 tons per day, a maximum bath depth Dmax of 120 mm is achieved by means of a raised section of the bottom along the length of the cooling zone, and in which the cooling capacity is chosen so that the temperature 20 mm above the bottom of the forehearth or feeder is reduced by at least 40° C., preferably by at least 50° C., between the beginning of the cooling zone and the entry to the homogenization zone.

Expressed more simply, the aim of the invention is to create an area at the beginning of the forehearth in the cooling zone(s), with a very shallow glass bath, by means of at least one raised section of the bottom, and to extract as much heat as possible from this shallow area, so that, depending on the length of the total conditioning stretch, the longest possible homogenizing zone is available, in which the remaining temperature differences can be equalized. However, outside the shallow cooling zone(s) the bath should be deeper in order to avoid greater glass level losses.

A comparison with the state of the art can demonstrate the amounts of energy which can be led off per hour with green glass, whereby a forehearth entry temperature T1 of 1280° C. is used as the basis:

TABLE 1

| Example | Throughput tons/day | Temperature reduction 0° C. | Energy per hour Kcal/h | Max. deviation °C. |
| --- | --- | --- | --- | --- |
| 1*) | 70 | 80 | 82,000 | 4–5 |
| 2*) | 70 | 100 | 102,000 | 4 |
| 3**) | 90 | 120 | 160,000 | 4 |
| 4**) | 160 | 160***) | 375,000 | 4 |

*) = comparative examples from "Sims" bath depth DB - 150 mm
**) = Bath depth DB = 120 mm
***) = for champagne bottles, 700 ml
TW (working temperature) = 1120° C.
portion weight (glass glob) = 950 g An increase in the cooling capacity solely by increasing the size of the radiation openings, i.e. with no change in the bath depth, neither produces the necessary temperature reduction nor does it lead to the desired thermal homogeneity. These requirements were only met when the bath depth was limited locally by the raised section of the bottom in accordance with the subject of the invention.

It is obvious the situation improves further as the depth is reduced, when, for example, the maximum depth Dmax is further reduced to 100 mm, 80 mm or less. All intermediate values are also advantageous.

The extremely shallow glass bath depths mentioned here are not self-evident at the high throughputs required today. The reason for this is that a drop in the glass level occurs along the length of the cooling zone and the remaining channel, the extent of which depends on the flow velocity. The flow velocity, and therefore the glass level drop, increases significantly with shallower glass baths.

It is obvious that the glass depth cannot be reduced below a certain minimum value in each specific case. These values can be determined by experiment.

It is also the intention of the invention to utilize a shallow bed cooling, with which it is possible to use known cooling systems to remove, in a relatively short distance, an extremely large proportion of the heat equivalent to the temperature difference between T1 and T2.

The temperature T1 is that at the outlet of the distribution channel or that at the forehearth entry, 20 mm below the bath surface, whereas temperature T2 is the temperature at the first or only extraction point. Temperature T1 is a result of the operating conditions required in the melting tank and typically lies in the range of 1250° to 1400° C. Temperature T1 is normally higher when the throughput or melting tank capacity is higher. Temperature T2 is determined by both the type of glass and by the forming conditions for the glass gobs which are normally produced, and typically lies in the range of 1120° to 1180° C. If possible the local variation of T2 should be kept within the tolerance range of ±4° C., preferably ±2° C.

The use according to the invention of a wide and shallow channel (for a given throughput or a given flow velocity) permits an extremely high level of cooling in the shortest possible distance with a simultaneous reduction in the differences in the flow velocity and in the temperature, and therefore also in the viscosity. It is advantageous if at least 30% of the amount of energy equivalent to the temperature difference between T1 and T2 is removed from the glass bath per meter of length at the beginning of the cooling zone. However it is particularly advantageous if the cooling effect is intensified and at least 40% or if possible, at least 50% of the amount of energy equivalent to the temperature difference mentioned is removed from the glass bath per meter of length in the cooling zone.

As already mentioned, it is possible to use known measures or methods for removing heat. Bottom cooling can be achieved by means of cooling channels installed in the bottom of the conditioning stretch and/or by means of reduced insulation in the bottom area. Furthermore it is possible to install surface cooling, either as an alternative or an addition, by means of variable openings in the roof, and/or by blowing in a gas, such as air and/or by means of cooling units which are installed above the glass surface without touching the glass bath. Finally it is also possible to cool in the glass itself, for example with cooling units which are submerged in the glass and which can also have the same effect as stirrers.

Prior art methods can also be used for the subsequent temperature homogenization in the glass. Such methods include a homogenization zone of the appropriate length with the best possible thermal insulation to the surroundings, uncooled stirrers or deflector plates, and also gentle heating of the glass from above by means of radiation or within the glass by means of direct electrical resistance heating and appropriate heating electrodes.

The use of shallow bed cooling in accordance with the invention brings all the colored glass under the influence of the cooling system for a short time. In particular, the bottom of the glass bath is also subject to cooling, for example, by means of significant radiation upwards. This effectively suppresses the negative effects of the interactive relationships between temperature, viscosity, residence time and glass flow, which are otherwise found.

The installation of the cooling zone right at the beginning of the conditioning stretch is of particular importance, as the temperature at this location is very high and the viscosity of the glass is very low.

The application of shallow bed cooling to the shortest possible length according to the invention allows the use of a basically linear channel, so that so-called "dead corners" can be avoided, as can additional heating of the glass in these dead corners. Furthermore the design of the cooling zone is made much more simple and the temperature distribution is homogenized to a large extent in the cooling zone.

The invention also concerns an apparatus for the implementation of the process with a conditioning stretch integrated in a forehearth between an inlet point and an extraction point and which consists of at least one cooling zone and a subsequent homogenization zone for the glass temperature, whereby a raised area is provided in the bottom of the flow channel in the cooling zone area, said raised area therefore being shallower than neighboring areas.

In order to achieve the aim of the invention, the apparatus according to the invention is characterized by the fact that the raised area covers the complete length of the cooling zone, that the maximum depth Dmax of the channel in the area of the cooling zone is 120 mm, and that the channel in the homogenization zone, which is adjacent to and follows the cooling zone, is at least 30 mm deeper.

The explanations given above in connection with the reduction of these values is still valid.

BRIEF DESCRIPTION OF THE DRAWINGS

Examples of the invention are explained in more detail below, with the aid of FIGS. 1 to 12.

DETAILED DESCRIPTION OF THE PREFERRED EMBODIMENTS

Unless otherwise stated the parts shown in section consist of the normal ceramic or refractory furnace and insulation materials.

Figure 1:
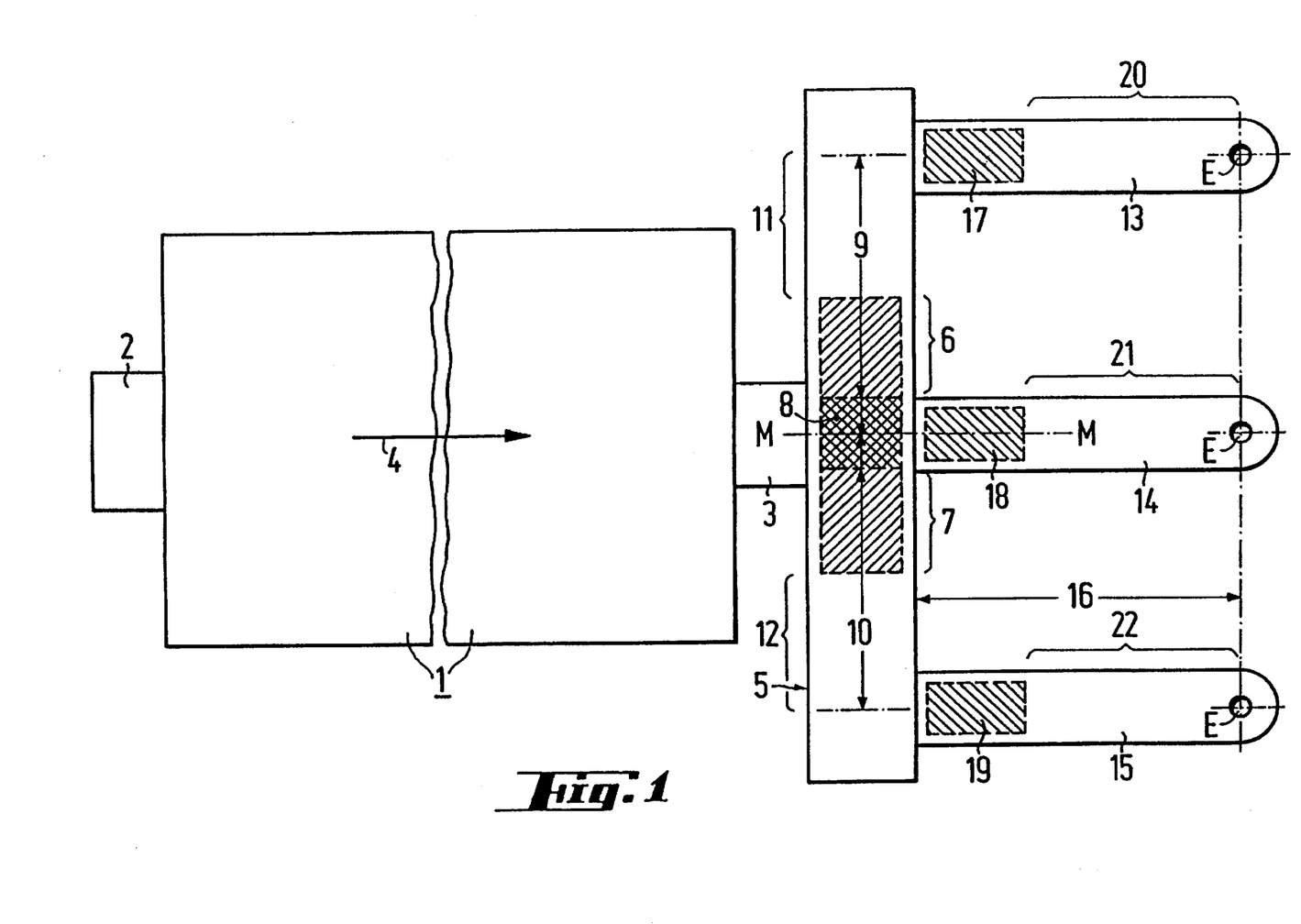
FIG. 1 is a schematic plan view of a melting tank, distribution channel and three forehearths, each with one extraction point.

FIG. 1 shows a melting tank 1, with a charging opening 2, which is normally constructed as a "doghouse", and the throat 3, through which the glass is removed from the melting tank. The glass formers, which can consist of the usual batch and cullet, and the resulting glass, flow through the melting tank in the direction of arrow 4. It is also possible to install several charging openings along both long sides of the melting tank, which produces a different flow pattern in the melter. A so-called riser can also be part of the throat 3. Such details are state of the art, so that no further particulars must be given here.

The distribution channel 5, which can also be constructed as a working end, is connected to the throat 3. In a first example of the invention, two cooling zones 6 and 7, which are indicated by hatching and are enclosed within a dotted line, are located one on each side of a central plane M—M. It is also possible to join these two cooling zones into a single cooling zone, in which case the cross hatched area 8 is then added.

Two conditioning stretches 9 and 10 are formed on both sides of the center line M—M, to which cooling zones 6 and 7 and, when applicable, area 8, belong. The remaining parts of the flow path of the glass melt then form the homogenizing zones 11 and 12. Homogenization of the temperature distribution is achieved as far as possible in the homogenizing zones.

In a second example of the invention three forehearths or feeders 13, 14 and 15 are connected to the distribution channel 5, each ending in an extraction point E. The total lengths of the forehearths 13, 14 and 15 in this example each constitute a conditioning stretch 16. In each of these conditioning stretches 16 there is a cooling zone 17, 18 or 19, which is marked by hatching and enclosed within a dotted line. It is emphasized that the diagram has been kept very simple in order to aid understanding. A homogenization zone 20, 21 and 22 follows each cooling zone in each of the conditioning stretches 16.

In the example shown it is possible to omit the cooling zones 6, 7 and 8 in the distribution channel 5, so that the glass enters the forehearths at a very high temperature.

Figure 2:
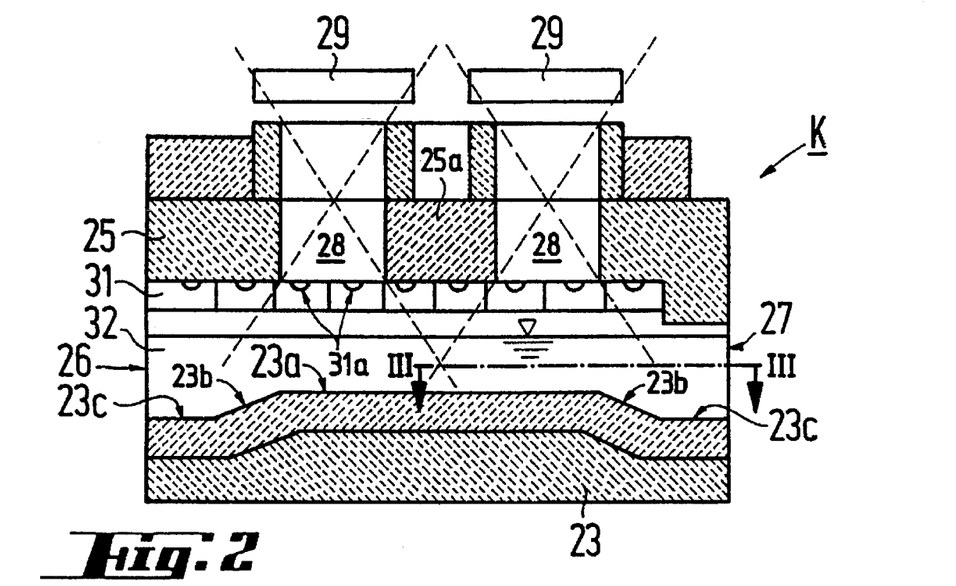
FIG. 2 is a longitudinal section through a cooling zone with two radiation openings in the roof.
Figure 3:
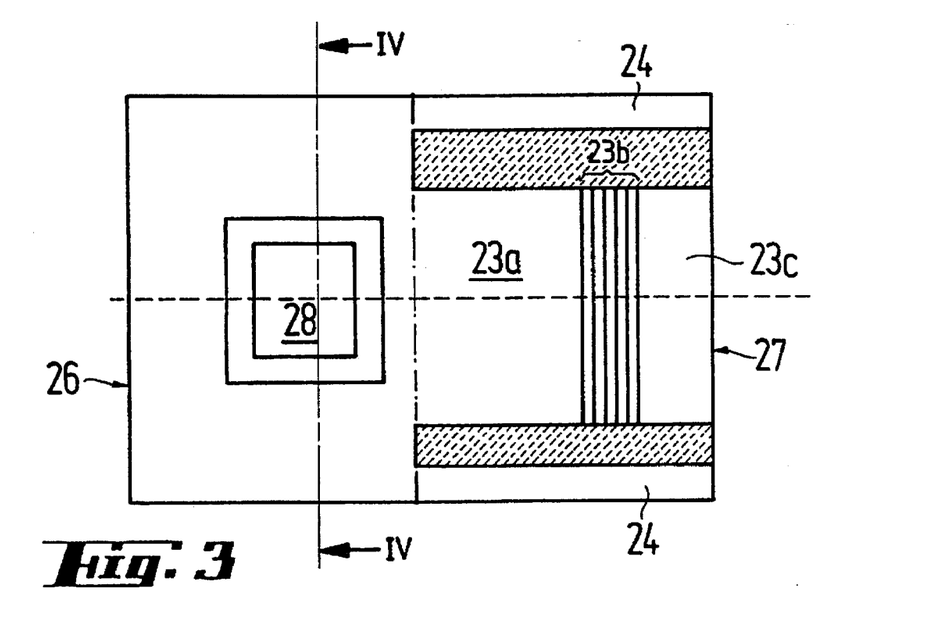
FIG. 3, on the left hand side, is a plan view of the object shown in FIG. 2, and on the right hand side, a section along the line III—III in FIG. 2 is shown.
Figure 4:
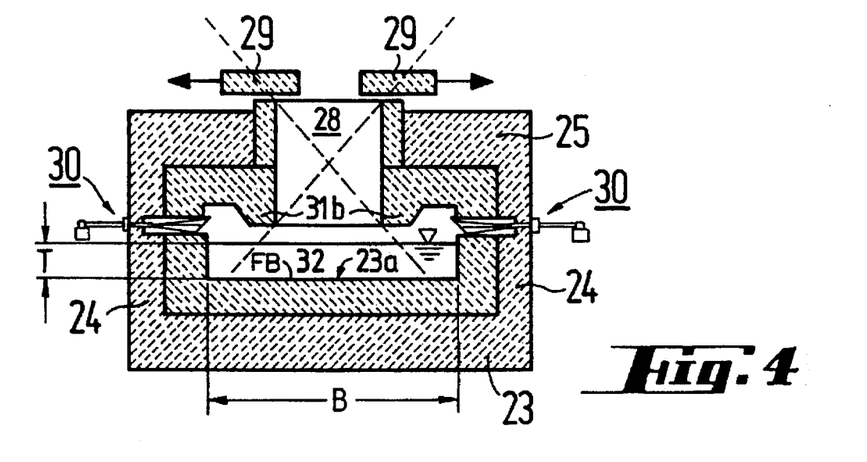
FIG. 4 is a cross section through the object shown in FIG. 3 along line IV—IV.

FIGS. 2, 3 and 4 show different views and sections of a cooling zone K, which can be installed as the cooling zones 17, 18 and 19 in the forehearths 13, 14 and 15. The cooling zones concerned represent a length of channel with a bottom 23, side walls 24 and a roof 25. The glass enters from the inlet side 26 and exits on the outlet side 27. In the example shown in FIGS. 2–4 two rectangular shaped openings 28 are provided in the roof 25, which allows loss of heat by radiation from the glass. In order to be able to control the flow of energy to the surroundings, covers 29 are located on top of the openings, by means of which the effective sizes of the openings 28 can be varied. The opening and closing movement is indicated by arrows. In both side walls 24 there are rows of burners 30 (FIG. 4), the nozzles of which are installed in the burner blocks 31. The burner blocks have openings 31a for the outlet of the combustion gases, which are shown in FIG. 2 as semicircles as the upper half is more or less hidden by ribs 31b which reach down from the roof 25, as approximately shown in FIG. 4.

FIGS. 2 and 3 show that the bottom 23 has a raised area 23a over a length which roughly corresponds to the length of the openings 28 plus the intermediate roof section 25a. This raised area extends across the complete width B of the channel. The raised area 23a is connected to the lower bottom level 23c at both ends by means of sloping areas 23b, whereby the height difference is at least 30 mm, preferably at least 40 mm. It can be clearly seen that the glass 32 is reduced to a very shallow cross section across this raised area 23a, which makes the high cooling capacity possible. The homogenizing zone begins at the outlet side 27.

FIGS. 2 and 4 show dotted diagonal lines which cross each other within the roof openings 28, and continue outside these openings 28. These lines characterize the radiation absorption effect that the background to these openings has on the glass melt 32. As a result of the varying radiation permeability of the glass melt and of the angular distribution of the radiation which emanates from every location on the glass surface, it is clear that there are no clearly defined limits. However, the diagonal lines give sufficient information to allow a calculation of the cooling effect of the roof openings 28 to be made. It can be seen that a relatively large surface area of the glass melt 32 is reached by the cooling effect of the cover openings 28.

Figure 5:
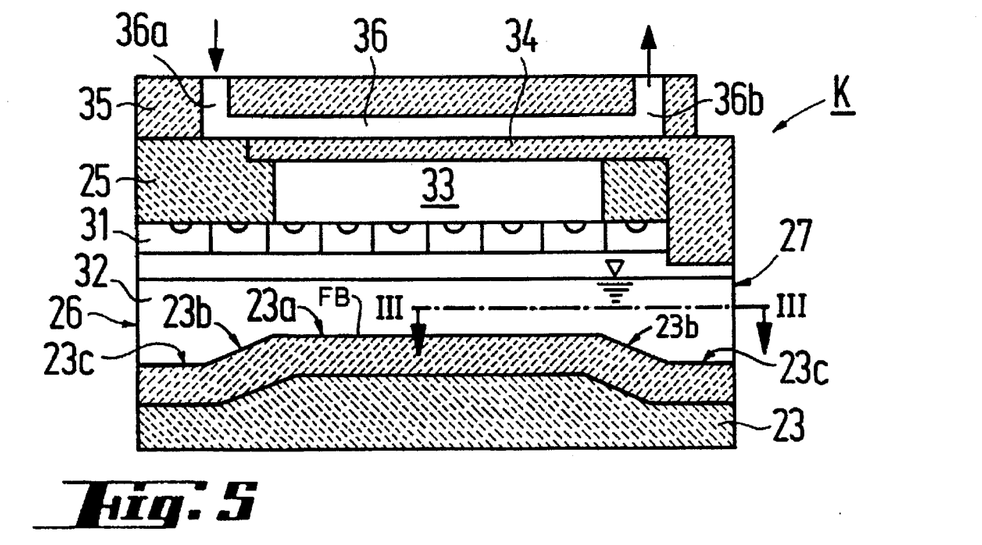
FIG. 5 is a longitudinal section through a cooling zone similar to that shown in FIG. 2, but with an enclosed cooling channel in the roof.

FIG. 5 shows a further version of the cooling zone K, in which a single hole 33 in the roof 25 is covered with a plate 34, which in this case forms the radiation receiver for the heat radiated by the glass bath 32. A U-shaped channel 36 for the passage of cooling air is provided above the plate 34 within the superstructure refractory 35. The entry 36a and exit 36b of the channel 36 point upwards; the flow direction as indicated by arrows. The temperature of the plate 34 is influenced by the quantity of cooling air used, and the cooling effect on the glass bath is thereby varied.

Figure 6:
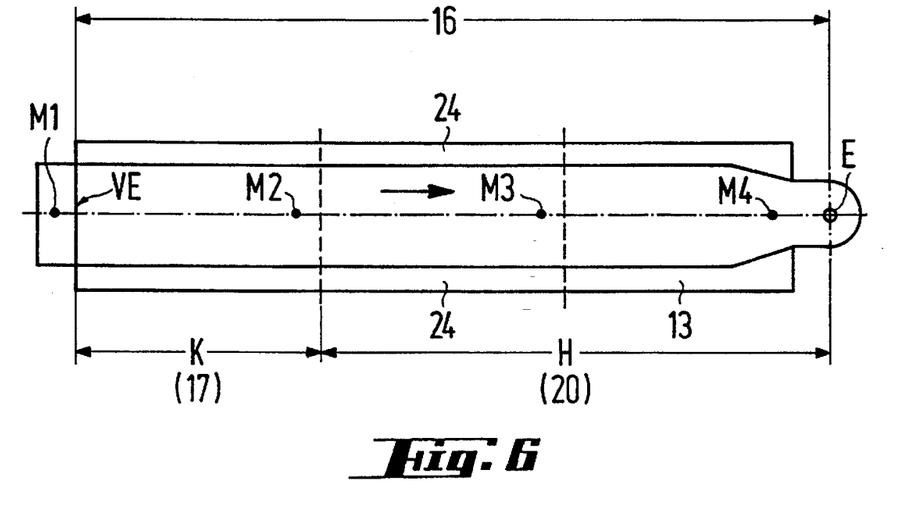
FIG. 6 is a schematic plan view of a forehearth.

FIG. 6 shows that the length of the cooling zone K or 17 covers almost exactly the first third of the forehearth, and the remaining length is formed by the homogenization zone H or 20. The following temperature metering points are indicated in the middle of the glass batch:

M1 = directly in front of the forehearth entry VE to measure the entry temperature T1;
M2 = right at the end of the cooling zone K or at the entry to the homogenization zone H;
M3 = in the middle of the homogenization zone H; and
M4 = shortly before the extraction point E, which is located in the bottom of a bowl, to measure the exit temperature T2.

Temperature sensors are installed 20 mm below the glass surface and 20 mm above the bottom at the measuring points M1 and M2. At measuring points M3 and M4 there are 3 temperature sensors installed vertically above one another, 20 mm, 60 mm and 100 mm below the glass surface, to measure the vertical temperature homogeneity.

Figure 7:
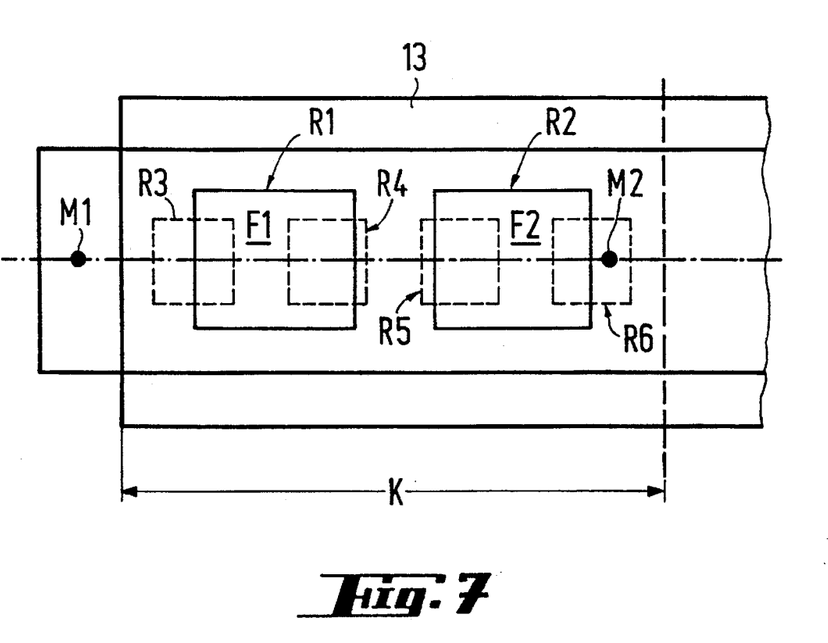
FIG. 7 is an enlarged section through left hand side of FIG. 6.

FIG. 7 shows the cooling zone K from FIG. 6 in a larger scale, the four dotted rectangles R3, R4, R5 and R6 show the cross sections of four conventional roof openings which correspond to position 28 in FIGS. 2–4. The sum of the opening cross sections in existing installations (also according to Sims) amounts to a maximum of approximately 20% of the area of the bottom of the forehearth cooling zone.

The two fully drawn rectangles R1 and R2 represent the cross sections of the openings F1 and F2 of the roof openings 28, which, according to the invention, amount to at least 30%, preferably at least 40, 50, 60 or even 70% of the cooling zone area as defined by the surface FB of the raised bank on the bottom (23a) of the forehearth. The surface FB, which is calculated from the length and width of the channel in the area of the raised bottom, can also be described as the plateau surface.

As already mentioned, success is not achieved solely by an increase in the cooling capacity, as there is a hotter bottom layer which flows faster than and below the slower flowing surface layer, and which is cooled less as the residence time is further reduced, whereby the negative result is amplified by an even steeper temperature gradient.

Figure 8:
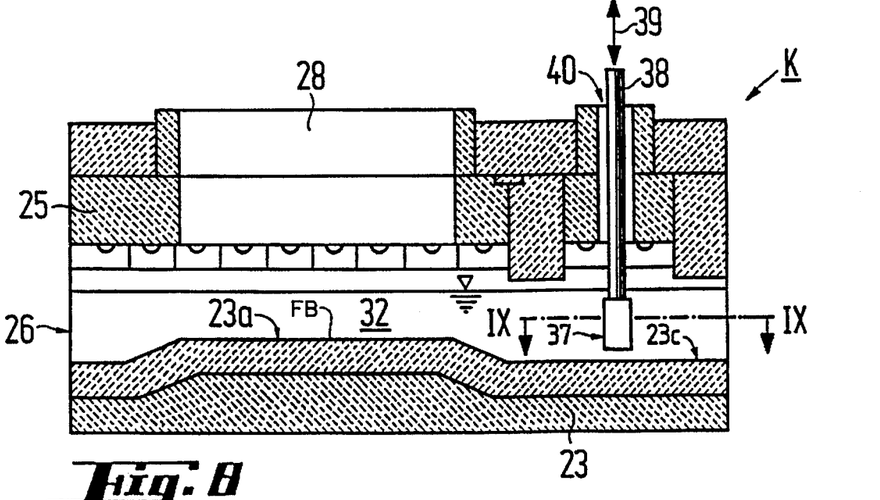
FIG. 8 is a longitudinal section through a cooling zone, which is extended to include an immersed cooler in the form of a barrier.
Figure 9:
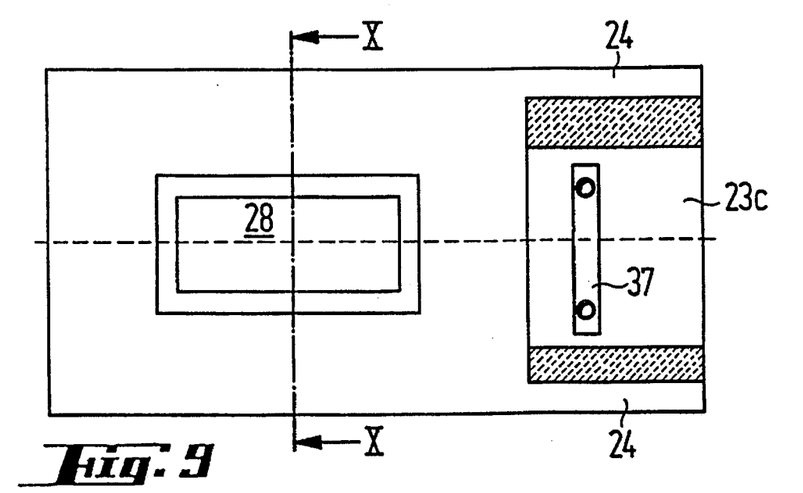
FIG. 9, on the left hand side, is a plan view of the object shown in FIG. 8, and, on the right hand side, a section along the line IX—IX in FIG. 8 is shown.
Figure 10:
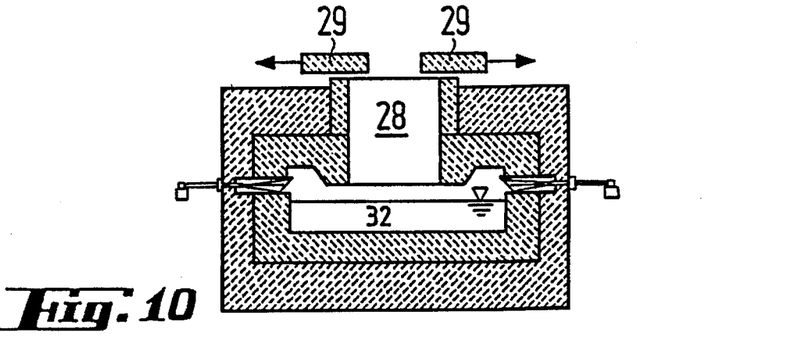
FIG. 10 is a cross section along line X—X through the object shown in FIG. 9.

The example shown in FIGS. 8, 9 and 10 is different from FIGS. 2–4 in that, instead of two openings 28, only a single larger opening 28 is provided, and while otherwise maintaining similar geometric proportions to those in FIGS. 2, 3 and 4, a further area is provided after the raised area 23a of the bottom 23. In this further area a submerged cooling device 37 is installed above the lower bottom level 23c, the cooling device being supplied with a cooling medium via two vertical pipes 38. The supply pipes 38 can also be designed as concentric pipes, but this version is not shown in detail. The cooling effect in the upper and/or lower regions of the glass bath 32 can be varied by raising or lowering the immersion cooling device 37 in the direction of the double arrow 39. The cooling effect can also be increased by periodic crosswise movement (perpendicularly to the glass flow). Combined movements of the immersion cooler are also possible. It is also very easy to install the immersion cooler 37 in the form of a stirrer, in order to achieve additional homogenization of the temperature in the glass bath. The supply pipes 38 pass through an opening 40 in the roof 25.

Figure 11:
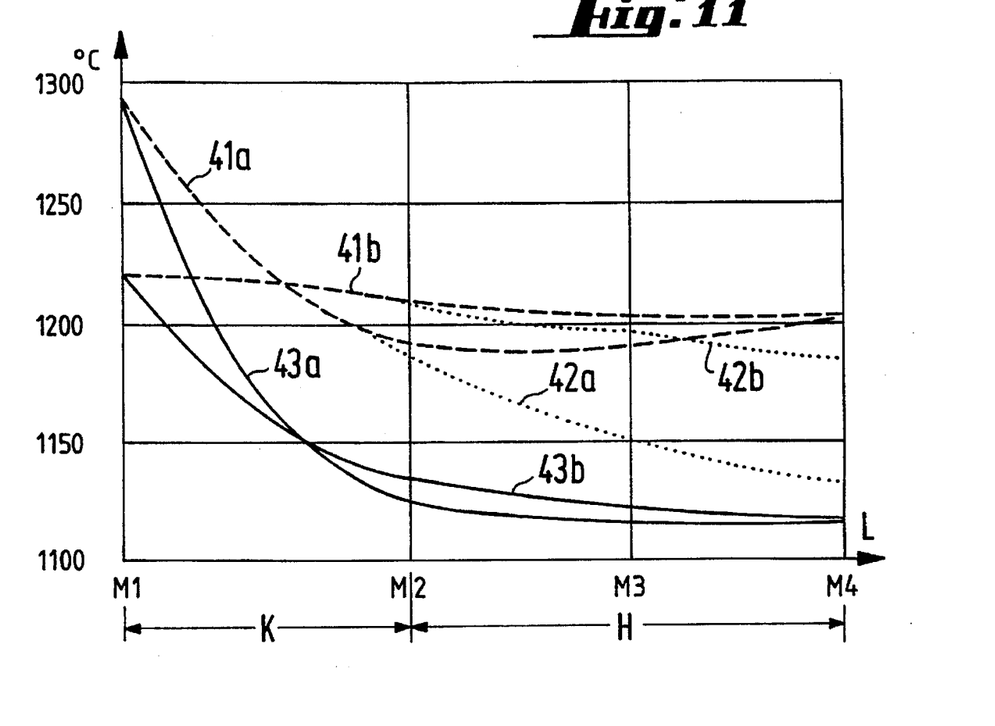
FIG. 11 graphically shows temperature values at several measuring points along the complete length of the conditioning stretch according to the state of the art and according to the invention.

Lines 41a and 41b in FIG. 11 show the temperature profiles 20 mm below the bath surface and 20 mm above the bottom along the distance "L" of a conditioning stretch with a constant bath depth of 150 mm, according to the state of the art. The measuring points M1 to M4 as described above are shown on the x-axis. It can be seen that the temperature in the cooling zone K can be reduced by about 100° C., i.e. from 1290° C. to 1190° C. just below the surface (line 41a), whereas the temperature just above the bottom is only reduced by about 10° C., i.e. from 1220° C. to 1210° C., whereby the difference is about 30° C. at the measuring point M2. This difference could be significantly reduced by the extraction point E at the end of the homogenization zone, so that a reasonably homogeneous temperature distribution around 1205° C. was achieved.

If an attempt is made in the same forehearth to reduce the glass temperature by 170° C., to a level of 1120° C., the temperature near the surface will only reach a value of about 1135° C., although the homogenization zone is also being used (line 42a). The temperature near the bottom can only be reduced to about 1185° (line 42b), so that the temperature distribution at the extraction point 3 is very inhomogeneous, with a dT of approximately 50° C., which cannot be reduced further in the homogenization zone H.

The lines 43a and 43b show the analog temperature profiles of the object of the invention with a shallower bath depth (120 mm) above a raised bank and with increased cooling capacity. The temperature near the surface at the end of the cooling zone has already been reduced by 165° C. to 1125° C., and the temperature near the bottom is reduced from 1220° C. to 1135° C., i.e. by 85° C.

The difference of 10° C. at the end of the cooling zone K can be reduced by 2° to 3° C. around the set point value of 1120° C. by the end of the homogenization zone H. Comparable conditions are valid for other inlet and outlet temperatures. A characteristic of the method according to the invention is therefore the significant temperature reduction near the bottom of the feeder and/or forehearth.

With a wide, shallow glass bath, the average temperature is reduced significantly along the relatively short cooling zone K, even with a high throughput of colored glass, as indicated by the steep temperature curve. In this way, with a given total length, there is a relatively long stretch available for the homogenization zone H, along which the average temperature remains largely unchanged. Despite the steep temperature drop in the cooling zone K and the even average temperature in the homogenization zone H, the edge zones on both sides of the wide glass bath may be heated additionally, as shown for the cooling zone in FIGS. 2–5 and FIGS. 8–10 (burner arrangement). Attention must merely be paid to the achievement of the best possible temperature distribution, by the combined effect of shallow bath cooling, edge and, where necessary, surface heating. However a relatively long current path is available in the homogenization zone, and in the cooling zone conditions have been established which ensure that the temperature differences at the individual points of the glass bath cross section are not too great at the entry to the homogenizing zone. As the glass depth is small compared with the width B, the heat losses through the side walls 24 are reduced, which also improves homogeneity and saves energy.

Figure 12:
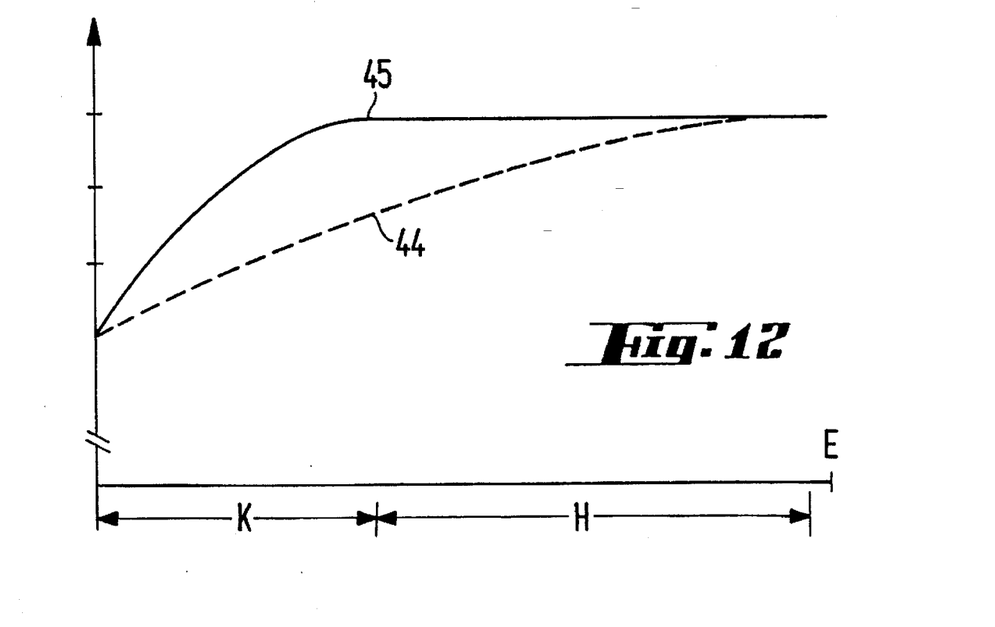
FIG. 12 shows viscosity values at several measuring points along the complete length of the conditioning stretch.

The lines 44 and 45 in FIG. 12 depict the variation of the average viscosity with a state of the art system (line 44) and according to the invention (line 45). The use of the shallow bath cooling increases the average viscosity very much earlier, whereby a more even flow velocity is achieved across the complete flow cross section, together with a better temperature homogeneity. The intensive shallow bath cooling systematically counteracts high flow velocities in areas of high temperature and low viscosity, as the cooling directly affects virtually all areas of the glass bath.

When the complete situation is considered it is clear that it is particularly important to install the section with the highest cooling capacity as near to the beginning of the conditioning stretch as possible.

By consideration of the invention special attention should be paid to the high throughputs, average flow velocities and temperature differences.

Forehearths normally have small cross sections and so high flow velocities occur. The average flow velocity of at least 8 m/h, which can be achieved with the invention, is a very good value if the required thermal homogeneity is achieved at the same time. In accordance with the invention the average flow velocity in a forehearth can even be increased to 17 m/h and above, without affecting the required average temperature T2 and/or the thermal homogeneity of the glass melt.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method of conditioning and homogenizing a glass stream flowing along a conditioning stretch, said conditioning stretch comprising a forehearth having an entry point and at least one extraction point with said conditioning stretch extending between said entry point and said at least one extraction point, said conditioning stretch including at least one cooling zone and a subsequent homogenizing zone for homogenizing the glass temperature, whereby the glass temperature in the conditioning stretch is reduced from an inlet temperature T1 to an outlet temperature T2, comprising the steps of:

arranging for, in the at least one cooling zone, a maximum bath depth Dmax of 120 mm of the glass stream, said maximum bath depth Dmax of 120 mm being provided by means of a raised section of a bottom along a length of the at least one cooling zone, and said at least one cooling zone having a throughput of said glass stream of at least 70 tons per day; and providing in the at least one cooling zone a cooling capacity so that the temperature of the glass stream 20 mm above the raised section of the bottom is reduced by at least 40° C. in the at least one cooling zone before entry into the subsequent homogenizing zone.

2. A method according to claim 1, wherein in said at least one cooling zone the maximum bath depth Dmax provided is about 100 mm.

3. A method according to claim 1, wherein in said at least one cooling zone the maximum bath depth Dmax provided is about 80 mm.

4. The method of claim 1 in which said glass stream comprises colored glass.

5. An apparatus for conditioning and homogenizing a glass stream flowing along a conditioning stretch, said apparatus comprising:

a conditioning stretch comprising a forehearth having an entry point and an extraction point for the glass stream with the conditioning stretch extending between the entry point and the extraction point;

at least one cooling zone positioned in said conditioning stretch and being connected to a homogenization zone positioned in said conditioning stretch for homogenizing the temperature of the glass stream;

raised area means provided in the at least one cooling zone for controlling a glass stream flowing through said at least one cooling zone so that the glass stream has a maximum glass depth Dmax in a portion of the at least one cooling zone of about 120 mm; and said homogenization zone including a channel which is at least 30 mm deeper than a bottom of said portion of the at least one cooling zone.

6. An apparatus according to claim 5, wherein said channel of said homogenization zone is at least 40 mm deeper than said bottom of said portion of the at least one cooling zone.

7. An apparatus according to claim 5, wherein said forehearth includes a roof and at least one opening is provided in said roof above the raised area means in the at least one cooling zone and a ratio between a horizontal cross sectional area of said at least one opening and a surface area of the raised area means amounts to at least 30%.

8. An apparatus according to claim 7, wherein the ratio is at least 40%.

9. An apparatus according to claim 7, wherein the ratio is at least 50%.

10. An apparatus according to claim 7, wherein the ratio is at least 60%.

11. An apparatus according to claim 7, wherein the ratio is at least 70%.

12. An apparatus according to claim 5, wherein an immersion cooler is positioned and arranged in said glass stream flowing through said at least one cooling zone after the raised area means in a direction of flow of the glass stream.

13. An apparatus according to claim 12, including means for raising and lowering the immersion cooler.

14. An apparatus according to claim 12, including means for periodically moving the immersion cooler horizontally at right angles to the direction of flow of the glass stream.

15. An apparatus according to claim 12, wherein the immersion cooler is in the form of a stirrer.

16. The apparatus of claim 5 in which in said at least one cooling zone the glass stream has a maximum glass depth Dmax of 100 mm.

17. The apparatus of claim 5 in which in said at least one cooling zone the glass stream has a maximum glass depth Dmax of 80 mm.

18. The apparatus of claim 5 in which said glass stream comprises colored glass.

* * * * *